(12) United States Patent
Carroll

(10) Patent No.: US 6,672,332 B2
(45) Date of Patent: Jan. 6, 2004

(54) ADJUSTABLE VERTICAL PRESSURE REGULATOR

(75) Inventor: Kent Carroll, Bolingbrook, IL (US)

(73) Assignee: Hose Shop, Ltd., Crystal Lake, IL (US)

( * ) Notice: Subject to any disclaimer, the term of this patent is extended or adjusted under 35 U.S.C. 154(b) by 154 days.

(21) Appl. No.: 10/039,483

(22) Filed: Oct. 23, 2001

(65) Prior Publication Data

US 2003/0075219 A1 Apr. 24, 2003

(51) Int. Cl.[7] ............................................. G05D 16/10
(52) U.S. Cl. ........................ 137/505.25; 137/505.28
(58) Field of Search ..................... 137/505.25, 505.28

(56) References Cited

U.S. PATENT DOCUMENTS

| | | |
|---|---|---|
| 473,069 A | 4/1892 | Giessenbier |
| 2,615,287 A | 10/1952 | Senesky |
| 2,918,081 A | 12/1959 | Lauer, Jr. |
| 3,474,822 A | 10/1969 | Kuhn et al. |
| 3,848,631 A | 11/1974 | Fallon |
| 3,890,999 A | 6/1975 | Moskow |
| 3,926,208 A | 12/1975 | Hoffman et al. |
| 4,064,890 A | 12/1977 | Collins et al. |
| 4,181,139 A | 1/1980 | Martini |
| 4,194,522 A | 3/1980 | Lucas et al. |
| 4,226,257 A | 10/1980 | Trinkwalder |
| 4,305,423 A | 12/1981 | Adler |
| 4,450,858 A | 5/1984 | Acomb |
| 4,648,431 A | 3/1987 | Strongert et al. |
| 4,785,847 A * | 11/1988 | Steer et al. ............ 137/505.25 |
| 5,086,807 A | 2/1992 | Lasnier et al. |
| 5,123,442 A | 6/1992 | Geuy et al. |
| 5,234,026 A | 8/1993 | Patterson |
| 5,280,778 A | 1/1994 | Kotsiopoulos |
| 5,368,022 A | 11/1994 | Wagner |
| 5,392,825 A | 2/1995 | Mims et al. |
| 5,411,053 A | 5/1995 | Markham et al. |
| 5,522,421 A | 6/1996 | Holt et al. |
| 5,669,369 A * | 9/1997 | Scott ..................... 137/505.25 |

\* cited by examiner

Primary Examiner—Stephen M. Hepperle
(74) Attorney, Agent, or Firm—Welsh & Katz, Ltd.

(57) ABSTRACT

An adjustable pressure regulator for controlling the delivery of a gas from a high pressure source to a lower pressure device at a predetermined pressure is provided. A piston, spring and insert work with pressurized gas to open and close the pressure regulator, allowing or interdicting the flow of gas. In an open state, the spring forces the piston away from the insert allowing pressurized gas to flow into the system. Downstream back pressure, against the piston, overcomes the force of the spring and forces the regulator to close at a predetermined gas pressure. Regulator closing pressure is determined by the biasing force of the spring and distance between the piston and insert. The position of the insert, relative to the piston, is adjustable such that the distance is increased or decreased resulting in the concomitant increase or decrease of pressure to the downstream device.

12 Claims, 5 Drawing Sheets

ADJUSTABLE VERTICAL PRESSURE REGULATOR

BACKGROUND OF THE INVENTION

The present invention concerns a novel pressure regulator. More particularly, the present invention relates to an adjustable pressure regulator for use in paint ball guns, which fire paint filled projectiles, using compressed gas. The present invention is adapted for use by existing guns as well as other pressurized gas devices.

Sporting events that provide the participant with an adventure in military strategy and the feel of the fear and exhilaration of battle have become very popular. Generally participants are equipped with a gas projectile gun or rifle (which can launch a projectile without seriously harming the victim) and protective gear and are divided into two or more combat groups each with the goal of surviving the others.

One such sporting event is commonly referred to as "paintball". In this event, participants fire paint-filled projectile balls at one another. In a typical paintball event, participants fire projectiles, or paintballs, at one another and, when struck, are "painted" by the paint ball. The objective of such an event is to be the last person that has not been "painted" or hit with a projectile.

Typically, the projectiles used in these events are propelled, generally using a compressed gas to avoid the potential dangers of explosives such as gun powder. The dangers of explosives include not only the physical danger of the explosion but also the increased speed that such explosions impart to projectiles, potentially making innocuous projectiles, such as paintballs, deadly. Moreover, compressed gas is less costly than explosives and is readily obtainable.

When these types of systems are used, compressed gas is provided or supplied from a high-pressure source carried by the participant in a gas bottle. Although high-pressure gas is needed at the gun firing mechanism to propel the paint balls, typically the pressure in these bottles is greater than the pressure needed to safely propel the projectile within the parameters of the game. As such, it is necessary to regulate the pressure of the compressed gas provided to the gun firing mechanism to allow projectiles to be launched at a safer velocity and prevent damage to the gun. Typically, a regulator is provided, mounted to the gun or the compressed gas bottle. That is, it is carried by the game participant.

Accordingly, there exists a need for a pressure regulator that can be easily adjusted to provide a downstream or outlet pressure. Desirably, such a regulator is sufficiently small and light-weight so that it does not increase, to any extent, the weight carried by a participant in a paint ball sporting event. Further, it would be desirable to provide a regulator that may be adapted to use on existing paint ball guns and which may be easily inserted and removed from a convenient location on such a gun.

Other objects and advantages of the present invention will become apparent as the description proceeds.

SUMMARY OF THE INVENTION

In accordance with the present invention, an adjustable pressure regulator for controlling the delivery of a gas from a high pressure source to a low pressure device at a desired outlet pressure, is provided. The adjustable pressure regulator comprises a body having an inlet port and an outlet port and defining a flow path for the gas from the high pressure source to the low pressure device. The regulator further comprises an insert, having a proximal end and a distal end, positioned in the body. The insert defines at least one inlet opening, an outlet opening at the distal end, and a flow path for gas there between. Further, a piston, having a proximal end and a distal end, positioned in the body such that the proximal end of the piston is near the distal end of the insert, for reciprocating movement relative thereto, is provided. The piston defines a flow path for gas therein, at least one inlet port, an insert docking chamber at its proximal end, and a back pressure region at its distal end.

Further, the piston insert docking chamber houses a sealing member positioned for sealing engagement with the distal end of the insert. In the operation of the device of the present invention, the piston is moveable, relative to the insert, between a closed state wherein the sealing member engages the distal end of the insert within the insert docking chamber to isolate the outlet opening from the at least one piston inlet port, and an opened state wherein the sealing member is disengaged from the distal end of the insert to permit flow communications from the insert outlet port to the piston inlet port. A biasing element, disposed for cooperating engagement with the piston to bias the piston and insert into the opened state, is provided, wherein when pressure at the piston back pressure region is greater than the desired outlet pressure, the piston is moved by back pressure, overcoming the force of the biasing element, to engage the insert, interdicting the further flow of pressurized gas. Further, when the pressure in the back pressure region is lower than the desired pressure, the force of the biasing element, overcoming any residual back pressure, causes the piston to move away from the insert, disengaging the piston from the insert, allowing the flow of pressurized gas. Further, the insert is adjustable relative to the piston such that an adjustment of the insert relative to the piston will vary the outlet pressure.

In a preferred embodiment of the present invention the distal end of the insert is conically shaped such that it may easily fit within the insert docking chamber at the proximal end of the piston, causing a sealing of the flow of gas. Further, in this embodiment, the sealing member, in the insert docking chamber of the piston, comprises a disk shaped sealing member, preferably of some flexible material such as plastic or rubber. When, due to high pressure within the regulator, the insert and piston are biased together, the distal end of the insert, having the opening through which pressurized gas is passed, is biased against the sealing disk such as to inhibit the flow of gas. In a preferred embodiment the regulator of the present invention is inserted in such paint guns vertically along its long axis, such as a clip of ammunition would be inserted into a real gun.

In a preferred embodiment, the biasing element is a spring seated coaxially about the piston. The piston is provided with a ring flange at its distal end onto which the spring may exert its biasing force to move the piston away from the insert. The spring and piston are generally held within a bonnet, which allows connection of the regulator to a paint ball gun. The bonnet is provided with a portal for air at atmospheric pressure, such that within the bonnet and outside of the piston, the spring is maintained at atmospheric pressure allowing it to be biased independent of the forces of the pressurized gas.

A more detailed explanation of the invention is provided in the following description and claims and is illustrated in the accompanying drawings.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
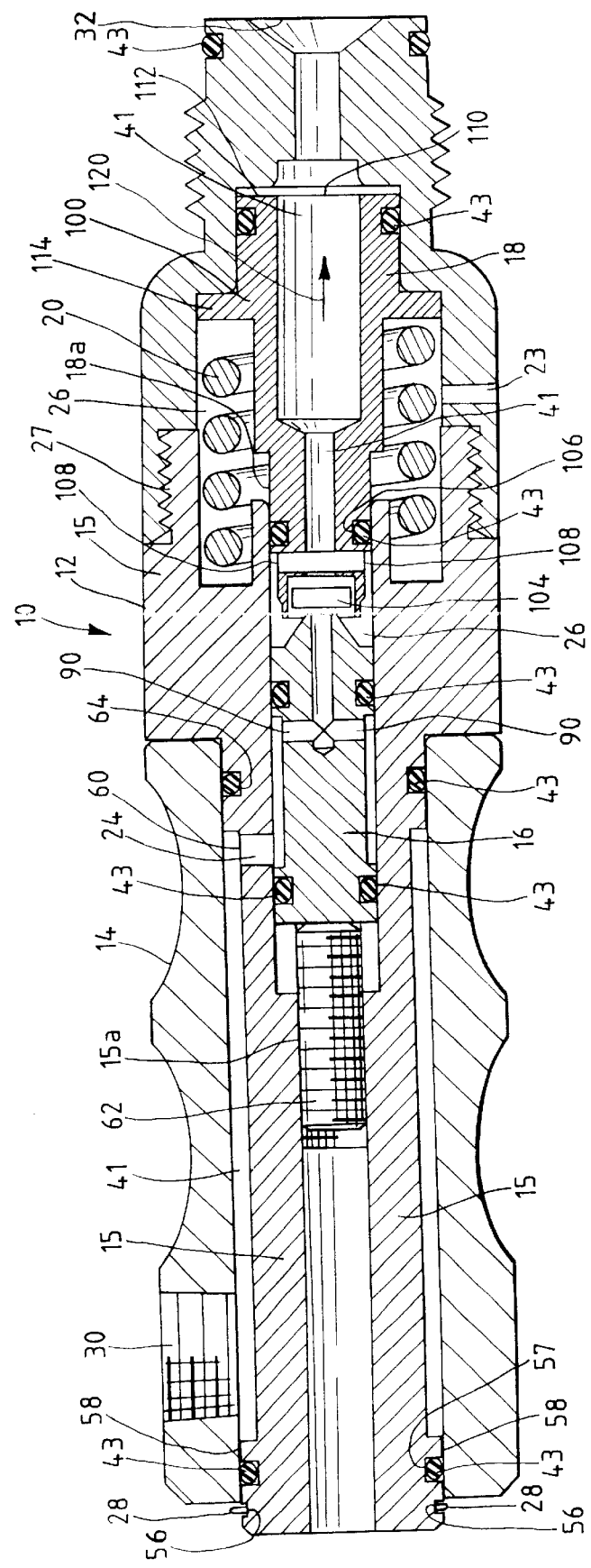
FIG. 1 is a sectional view of a pressure regulator device of the present invention, showing the regulator in a closed position.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

The disclosure of each patent cited herein, whether or not done so specifically, is incorporated herein by reference.

Figure 2:
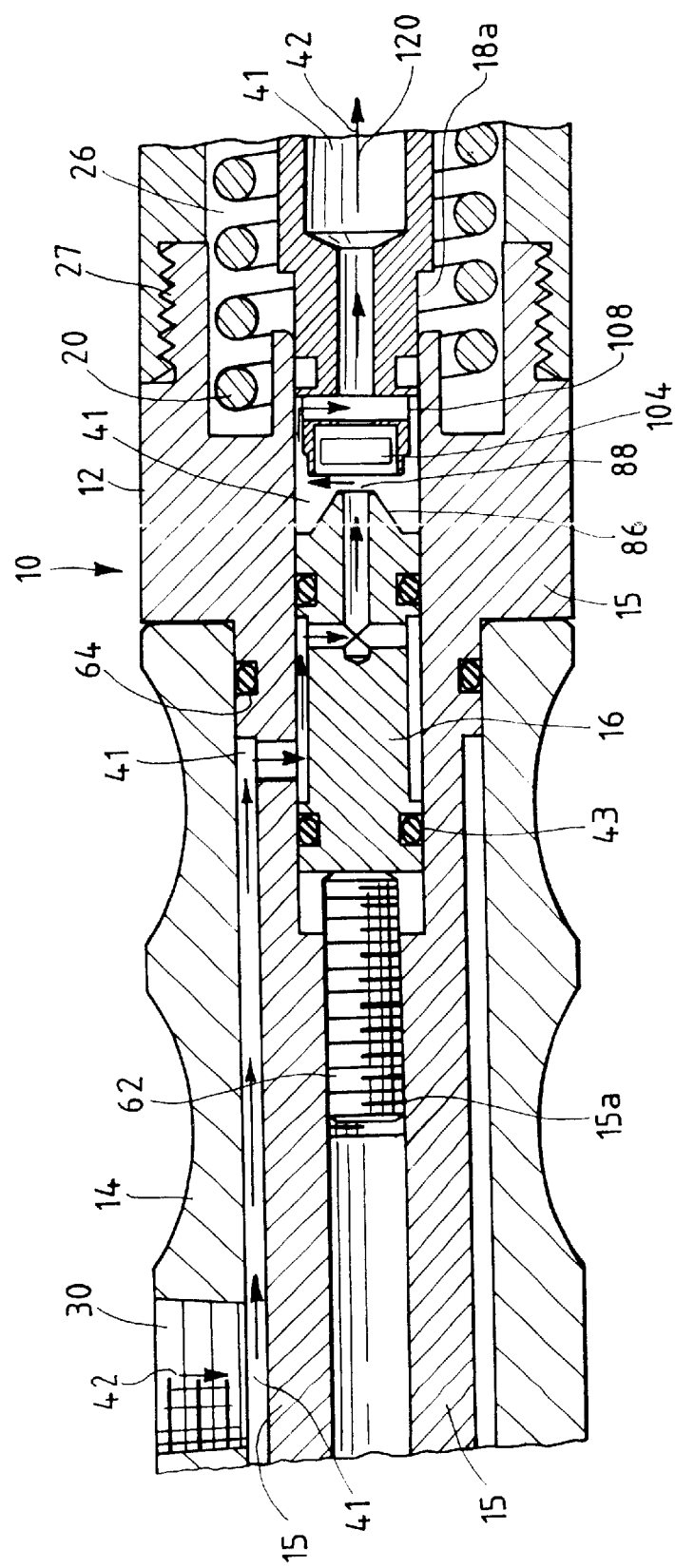
FIG. 2 is a partial sectional view of the pressure regulator of FIG. 1, showing the pressure regulator in an open position.

Referring to the drawings, it may be seen that a pressure regulator device 10 including generally, a body 12 comprised of a gripping sleeve 14 and a gas distribution body 15, an insert 16, a piston 18, a biasing element such as the exemplary coil spring 20, and a bonnet 22. The insert 16, piston 18 and spring 20 are disposed within cavities 24, 26 within body 12 and bonnet 22 and are secured there between. Cavities 24 and 26 further comprise walls 24a and 26a, respectively, defining cavities 24 and 26. The body 12 and bonnet 22 are fastened together with screw fastenings 27 (each member 12 and 22 having the appropriate cooperative screw elements). Sleeve 14 is maintained on gas distribution body 15 by ring clip 28 (FIG. 2). Regulator 10 defines a long axis, show as line Y—Y in FIG. 1, and regulator 10 is generally inserted into a paint ball gun (not shown) such that the long axis is generally vertically oriented. While vertical orientation is a preferred orientation, it is to be understood that regulator 10 may be inserted into a device in any orientation without departing from the novel scope of the present invention.

Body 12 includes an inlet port 30 at which a high-pressure gas (from, for example, a compressed gas bottle (not shown)), is supplied to a compressed gas gun, such as a paint ball gun, (also not shown). The regulator of the present invention, which has been designed to include the necessary connection means for attachment to a source of compressed gas and to a paint ball gun, has been designed to be used in existing paintball guns (as well as other compressed gas devices). It is to be understood, however, that any manner of connecting the present invention to paint ball guns or other compressed gas devices, may be used without departing from the novel scope of the present invention.

Pressurized gas flows from inlet 30 and is supplied to the gun at an outlet port 32 formed at the distal end of bonnet 22. It is to be understood that the device of the present invention is intended to provide compressed gas to a paint ball projectile gun. Such guns use gas pressure to propel paint ball projectiles from the gun to a target, such as a player in, for example, a mock guerilla war. The guns used in such play are designed to maintain gas pressure within the gun, by sealing means known in the art, until the trigger is pulled and a projectile is fired. Upon the firing of the gun, the gas pressure in the gun is momentarily relieved (through the muzzle of the gun). Subsequently, the gun is resealed allowing new pressure to be built up. Pressure is built up by the flow of pressurized gas from the gas cartridge (or other source), through the regulator and into the gun. It will be understood then, that within the gun and regulator 10 of the present invention, pressure from the gas cartridge has a down stream flow and upon pressurization, back flow pressure from the gas in the gun is created.

FIG. 2, which shows regulator 10 in the open state (that is the state immediately after the gun has been fired and gas flows to recharge the system), illustrates a gas or flow path 41, indicated by the arrow 42, defined in the body 12, about and through distribution body 15, from the inlet port 30 to the outlet port 32. Gas flows into regulator 10, along flow path 41, and enters the paint ball gun, where at the desired pressure further gas flow is interdicted, in a manner which will be described in detail below.

Figure 3:
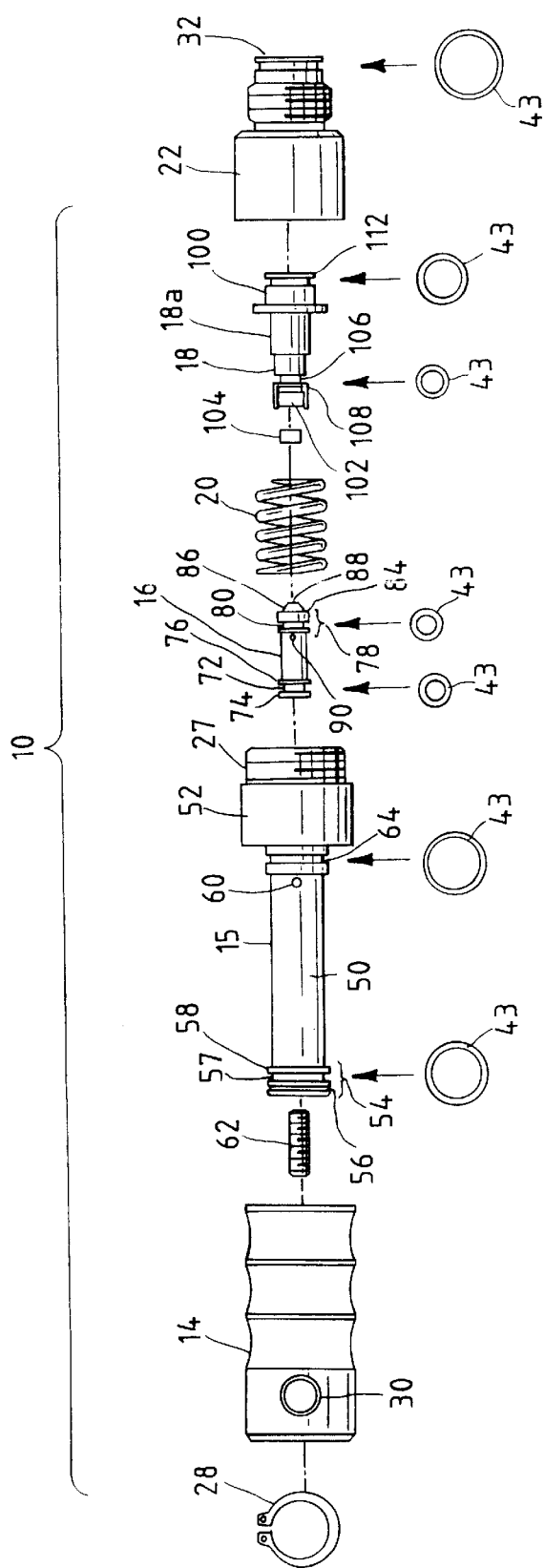
FIG. 3 is an exploded plan view of a pressure regulator device of the present invention.

FIG. 3 shows an exploded view of the parts of regulator 10. It may be seen that a number of O-ring sealing 43 elements are illustrated intermittently along the entire span of flow path 41 to help seal the path of flow of gas within regulator 10. While O-rings 43 are shown in the illustrative embodiment, it is to be understood that other sealing devices, and/or method, may be utilized, for sealing purposes, within regulator 10 without departing from the novel scope of the present invention.

Figure 4:
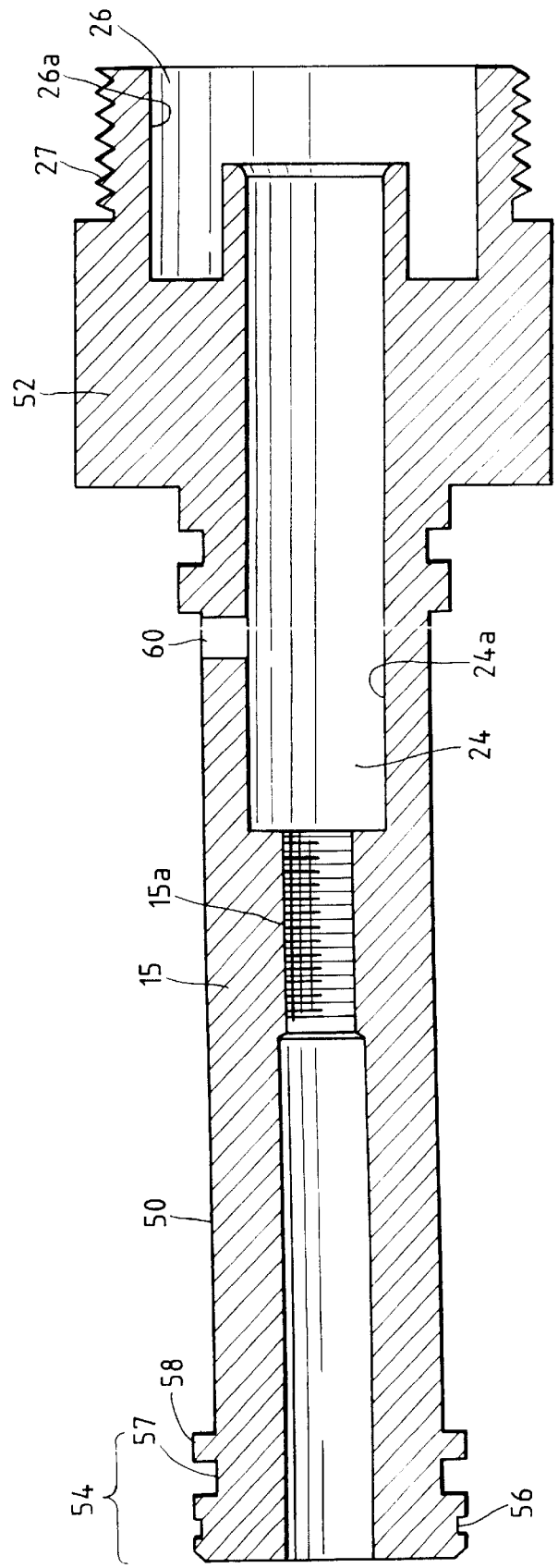
FIG. 4 is a sectional view of a gas distribution body of the present invention.

FIG. 4 illustrates a cross section of gas distribution body 15. Distribution body 15 generally comprises a first cylindrical body portion 50, and a second cylindrical body portion 52, having a larger diameter than portion 50. Gas distribution body 15 further defines a thin end cylinder 54, at its proximal end, having a first channel 56, in which a clip ring 28 (FIG. 1) may be attached, and second channel 57, defined in thin end cylinder 54, in which a sealing element, such as an O-ring 43 (FIG. 3) may be engaged. Channel 57 defines a cylindrical ring element 58, which forms the distal end of the gas flow path 42 (FIG. 1). Gas distribution body 15 further defines a gas flow orifice 60, which allows pressurized air to flow into gas distribution body 15 and into cavity 24, which is defined within body 15. Insert 16 is placed within cavity 24. Insert 16 may be adjusted within cavity 24 by rotational movements of adjusting screw 62 (FIG. 1). Adjusting screw 62, which is illustrated as an externally threaded cylinder, may be of any conventional design; in a preferred embodiment, adjusting screw 62 further defines a socket opening, at a first or proximal end 63, into which a key wrench, such as an Allen wrench or other tool (not shown), may be inserted to rotationally adjust adjusting screw 62 in or out of a cooperatively threaded section 15a of gas distribution body 15. Body 15 further comprises a mid-channel 64 in which a sealing element, such as an O-ring 43 may be seated.

Figure 5:
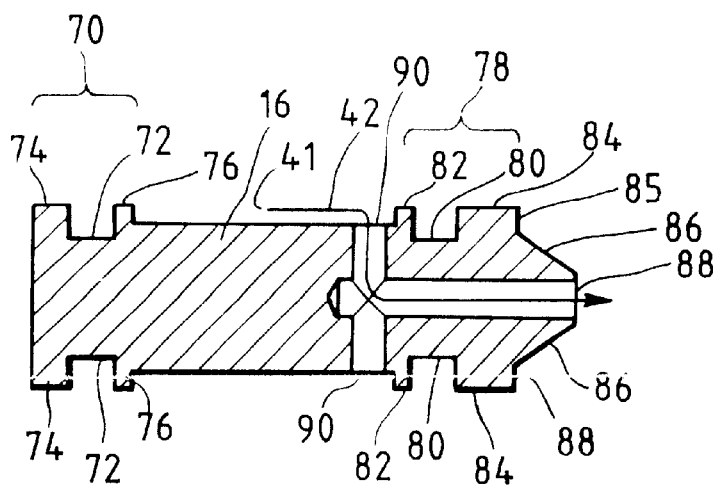
FIG. 5 is a sectional view of an insert of the present invention.
Figure 6:
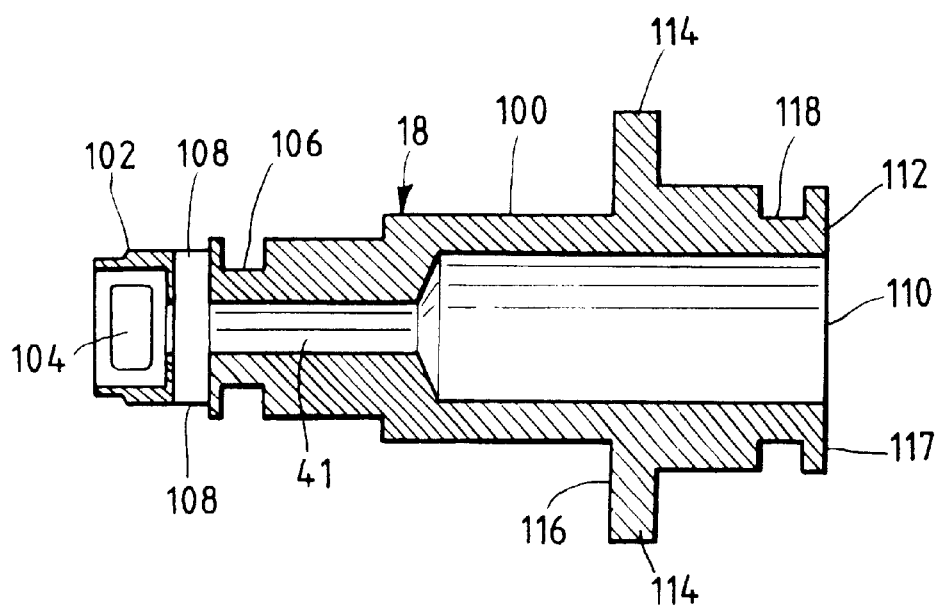
FIG. 6 is a sectional view of a piston of the present invention.

As can be seen in the figures, and most particularly in FIG. 5, insert 16 comprises generally a cylindrical body shaped somewhat generally like a fire hydrant. Insert 16 further comprises a thin cylindrical ring 70 defining a channel 72, therein, for placement of a sealing element, such as the exemplary O-ring 43. Cylindrical ring 70 further comprises, at its proximal end, sealing legs 74 and 76 which are of a diameter such that they may contact the interior wall 24a of cavity 24 in gas distribution body 15, so as to assist, along with an O-ring 43, in sealing the gas flow passage 41.

Insert 16 further defines, near its distal end, a second thin cylindrical ring 78 which defines a channel 80 formed within sealing legs 82 and 84. Channel 80 can accept a sealing element, such as an O-ring 43, to seal the distal end of insert 16 within cavity 24. Sealing legs 82 and 84 are of a diameter such that they can contact interior wall 24a of distribution body 15 to further aid the sealing of gas flow path 41. Distally from sealing leg 82, insert 16 forms a conical tip 86 which defines a gas passage opening 88 there through. Between sealing legs 76 and 82, insert 16 defines at least one gas port 90, which forms a part of gas flow path 41 (FIG. 1). In the illustrative embodiment two gas ports 90 are illustrated. It will be understood by a person having ordinary skill in the art, that any number of gas ports 90 may be included in insert 16 without departing from the novel scope of the present invention.

Piston 18, as shown in FIGS. 1 and 3, also comprises a generally cylindrical member 100. An insert docking chamber 102, defined at the proximal end of piston 18, is suitably sized to allow the generally conical shaped tip 86 of insert 16 to be placed within. It may be seen that a sealing element 104, such as a disk made of flexible material, is placed within docking chamber 102, and will be described in greater detail below. As can be seen in FIG. 1, piston 18 is located within both body 12 and bonnet 22 and spans both cavity 24 and cavity 26. Near its proximal end, outer walls 18a of piston 18 are in contact with cavity walls 24a. A channel 106 is formed in wall 18a to accommodate a sealing element, such as an O-ring 43. Distally adjacent to docking chamber 102, piston 18 defines at least one gas port 108 to allow the flow of gas through path 41. In the illustrative embodiment, two gas ports 108 are shown; however, it is to be understood that any number of gas ports 108 may be included without departing from the novel scope of the present invention.

While the term "O-ring" has been used, herein, to describe a preferred type of sealing element, it will be understood that the term has been used loosely to describe all types and sizes of "O-rings" and that each particular sealing element described herein and shown in the drawings may be different, in size, shape and sealing capacity, from other sealing elements described and shown herein, without departing from the novel scope of the present invention.

Gas ports 108 allow entry of gas into piston 18. Piston 18 defines a section of gas path 41 therein, extending from gas ports 108 through to opening 110 defined at the distal end 112 of piston 18. Piston 18 further defines a cylindrical ring 114, which forms a flange 116, against which spring element 20 may be biased. Distal end 112 of piston 18 forms a back pressure region 117, which acts like a sail, for gas pressure upstream to push against piston 18, contra to the biasing force of spring 20, as will be described in greater detail below. Piston 18 further defines a distal sealing channel 118 into which an O-ring 43 can be inserted for sealing purposes. The O-ring 43 of channel 118 prevents back pressure from the gun (not shown) from returning to flow path 41 by interdicting the entry of gas at the distal end of regulator 10, entering cavity 26 along the edges of piston 18 and back into port(s) 108. Spring 20 encircles piston 18, within cavity 26, such that piston 18 may move coaxially, with respect to spring 20, depending on internal pressure, as described in greater detail below. A pressure relief opening 23 is defined in the wall of bonnet 22, to allow cavity 26 to remain at atmospheric pressure allowing spring 20 to be freely biased without effect from forces of gas pressure.

Operation of the regulator 10 and movement of the various parts relative to one another will now described with reference to FIGS. 1 and 2, in which FIG. 1 illustrates the regulator 10 in a closed position and FIG. 2 illustrates the regulator 10 when it is open.

Referring to FIG. 2, when the regulator is open, the force from spring 20, that is exerted on piston flange 116, urges the piston 18 outwardly within regulator 10 (as indicated by the arrow 120 (FIGS. 1 and 2) showing piston 18 moving to the right). As will be understood from a study of the figures, the insert 16 is thus separated from the insert docking chamber 102 of piston 18, and sealing element 104, when piston 18 moves to the right. As piston 18 moves outwardly within regulator 10, insert tip 86 is freed from piston 18 allowing the flow of gas, along path 41, from opening 88 through to gas ports 108, such that gas may flow from a gas source at inlet 30 to outlet 32.

Prior to the application of pressurized gas into the regulator 10—gun system, regulator 10 is in its default, open position (FIG. 2). In the open position, as previously described, piston 18 is biased apart from insert 16 by spring 20. As gas flows into the inlet port 30, the pressure increases in flow path 41 and downstream throughout regulator 10 and into the gun. Because the gun is sealed, pressure build up causes back pressure to develop against distal end 112 of piston 18 in back pressure region 117. The force of spring 20 is thus overcome by the back pressure and piston 18 is moved, relatively, to the left (in FIGS. 1 and 2). Sealing element 104, illustrated as a disk of flexible material, causes opening 88 to be sealed as insert 16 and piston 18 are drawn together. The back pressure force, which is a predetermined (based on the force necessary to compress spring 20 and the distance between piston 18 and insert 16) desired pressure, maintains a force against pressure from the downstream portion of the gun (not shown). When the gun is fired, back pressure is relieved allowing the biasing force of spring 20 to cause the regulator to open (FIG. 2) allowing gas to fill the upstream portion of the gun and regulator 10, until back pressure once again overcomes spring 20, and seals flow path 41.

As the outlet side pressure reaches the predetermined desired pressure, the gas pressure behind the piston (on the down stream side) urges the piston relatively to the left (in the figures) such that conical head 86 of insert 16 is again engulfed by docking chamber 102, sealing opening 88 (with sealing disk 104) and closing regulator 10.

The force exerted by the compressed gas on back pressure region 117 maintains regulator 10 closed (by urging docking chamber 102 and sealing element 104 onto conical head 86 covering tip 88 and blocking the flow path of gas). When the pressure at outlet 32 falls, pressure on back pressure region 117 likewise decreases and spring 20 urges piston 18 to the right, opening regulator 10. In the event of a leak of pressure in the downstream elements of regulator 10 or the gun, gas pressure may be recharged automatically by the movement of piston 18, relatively to the right (in the figures) opening the regulator unit 1 the system is again recharged to the desired pressure.

It may be seen that relative rotation of adjusting screw 62 will cause a change in the position of insert 16 within gas distribution body 15. Such change in position permits adjustment of the pressure regulator 10 outlet pressure by increasing or decreasing the compression of spring 20 needed to seal the opening 88 of insert 16. That is, because a seal is formed by the pressing of opening 88 against sealing element 104 in piston 18, moving insert 16 relative to piston 18 causes the force needed to close regulator 10 to vary proportionately to change in distance. As will be recognized by those having skill in the art, this adjustment will thus increase and/or decrease the pressure required on the back pressure region 117 to overcome the biasing effect of spring 20.

For example, if adjusting screw 62 is rotated so as to allow insert 16 to move, relatively, to the left (in the figures) (thus further away from piston 10), more gas pressure, on back pressure region 117, will be required to urge piston 18 to the more distant insert 16; thereby resulting in a higher delivered pressure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

Although an illustrative embodiment of the invention has been shown and described, it is to be understood that various modifications and substitutions may be made by those skilled in the art without departing from the novel spirit and scope of the invention.

What is claimed is:

1. An adjustable pressure regulator for controlling the delivery of a gas from a high pressure source to a low pressure device at a desired outlet pressure, the adjustable pressure regulator comprising:

a body having an inlet port and an outlet port and defining a flow path through a piston for gas from the high pressure source to the low pressure device;

an insert, having a proximal end and a distal end, positioned in the body, said insert defining at least one inlet opening, an outlet opening at the distal end, and a flow path for gas there between;

the piston, having a proximal end and a distal end, positioned in the body such that the proximal end of the piston is near the distal end of the insert, for reciprocating movement relative thereto, the piston defining a flow path for gas there through, the bore forming the flow path having a first chamber within the piston expanding to an enlarged diameter to further reduce gas pressure, at least one gas inlet port, an insert docking chamber at its proximal end, and a back pressure region at its distal end;

the insert docking chamber including a sealing member comprising a disk positioned for sealing engagement with the distal end of the insert, the piston being moveable relative to the insert between a closed state wherein the docking chamber sealing member engages the distal end of the insert to isolate the insert gas outlet opening from the at least one piston inlet port, and an opened state wherein the docking chamber sealing member is disengaged from the distal end of the insert to permit flow communications from the insert outlet port to the piston inlet port; and a biasing element disposed for cooperating engagement with the piston to bias the piston and insert into the opened state, wherein when pressure at the piston back pressure region is greater than the desired outlet pressure, the piston is moved, against the biasing element, to engage the insert, interdicting the further flow of pressurized gas, and wherein when the pressure in the back pressure region is lower than the desired pressure, the force of the biasing element causes the piston to disengage form the insert, allowing the flow of pressurized gas.

2. The adjustable pressure regulator of claim 1, wherein the insert is adjustable relative to the piston such that an adjustment of the insert relative to the piston may vary the outlet pressure.

3. The adjustable pressure regulator of claim 1, wherein the regulator defines an outlet end and the outlet end may be coupled to existing devices that utilize compressed gas.

4. The adjustable pressure regulator of claim 1, wherein the biasing element is a spring.

5. The adjustable pressure regulator of claim 1, wherein the disk comprises flexible material.

6. The adjustable pressure regulator of claim 1, wherein said inlet port can accommodate a source of compressed gas.

7. The adjustable pressure regulator of claim 1, wherein said regulator may be coupled to a paint ball gun.

8. The adjustable pressure regulator of claim 1, wherein a flange at the distal end of the piston comprises the back pressure region.

9. An adjustable pressure regulator for controlling the delivery of a gas from a compressed gas cartridge to a paint ball gun, a desired outlet pressure, the adjustable pressure regulator comprising:

a body having an inlet port and an outlet port and defining a flow path through a piston for gas from the compressed gas cartridge to the paint ball gun;

an insert, having a proximal end and a distal end, positioned in the body, said insert defining at least one inlet opening, an outlet opening at the distal end, and a flow path for gas there between;

a piston, having a proximal end and a distal end, positioned in the body such that the proximal end of the piston is near the distal end of the insert, for reciprocating movement relative thereto, the piston defining a flow path for gas there through, the bore forming the flow path having a first chamber within the piston expanding to an enlarged diameter to further reduce gas pressure, at least one gas inlet port, an insert docking chamber at its proximal end, and a back pressure region at its distal end;

the insert docking chamber including a sealing member comprising a disk positioned for sealing engagement with the distal end of the insert, the piston being moveable relative to the insert between a closed state wherein the docking chamber sealing member engages the distal end of the insert to isolate the insert gas outlet opening from the at least one piston inlet port, and an opened state wherein the docking chamber sealing member is disengaged from the distal end of the insert to permit flow communications from the insert outlet port to the piston inlet port; and a spring disposed for cooperating engagement with the piston to bias the piston and insert into the opened state, wherein when pressure at the piston back pressure region is greater than the desired outlet pressure, the piston is moved, against the spring, to engage the insert, interdicting the further flow of pressurized gas, and wherein when the pressure in the back pressure region is lower than the desired pressure, the force of the spring causes the piston to disengage form the insert, allowing the flow of pressurized gas, the relative positions of the piston and insert being changeable to vary the delivered gas pressure.

10. The adjustable pressure regulator of claim 9, wherein the disk comprises a flexible material.

11. The adjustable pressure regulator of claim 9, wherein a flange at the distal end of the piston comprises the back pressure region.

12. The adjustable pressure regulator of claim 9, wherein the regulator is installed in the paint gun in a generally vertical orientation.

* * * * *